United States Patent
Gilliland et al.

(10) Patent No.: US 11,358,729 B2
(45) Date of Patent: Jun. 14, 2022

(54) HYBRID TILTROTOR DRIVE SYSTEM

(71) Applicant: Bell Textron Inc., Fort Worth, TX (US)

(72) Inventors: Colton James Gilliland, Northlake, TX (US); Mark Alan Przybyla, Keller, TX (US); Eric Stephen Olson, Fort Worth, TX (US)

(73) Assignee: Bell Textron Inc., Fort Worth, TX (US)

( * ) Notice: Subject to any disclaimer, the term of this patent is extended or adjusted under 35 U.S.C. 154(b) by 22 days.

(21) Appl. No.: 17/161,183

(22) Filed: Jan. 28, 2021

(65) Prior Publication Data

US 2021/0309381 A1    Oct. 7, 2021

Related U.S. Application Data

(62) Division of application No. 15/967,831, filed on May 1, 2018, now Pat. No. 10,906,656.

(51) Int. Cl.
| | |
|---|---|
| *B64D 27/02* | (2006.01) |
| *B64C 29/00* | (2006.01) |
| *B64D 27/10* | (2006.01) |
| *B64D 27/24* | (2006.01) |

(52) U.S. Cl.
CPC .......... *B64D 27/02* (2013.01); *B64C 29/0033* (2013.01); *B64D 27/10* (2013.01); *B64D 27/24* (2013.01); *B64D 2027/026* (2013.01)

(58) Field of Classification Search
CPC ........ B64D 27/02; B64D 27/10; B64D 27/24; B64D 27/26; B64D 2027/026; B64D 35/00; B64D 35/08; B64C 29/003; B64C 27/12; B64C 27/28; B64C 27/52; B64C 29/02; F02C 6/14; F02C 7/32; F02C 7/36
See application file for complete search history.

(56) References Cited

U.S. PATENT DOCUMENTS

| | | | |
|---|---|---|---|
| 7,866,598 B2 | 1/2011 | Waide et al. | |
| 8,708,273 B2 | 4/2014 | Oliver | |
| 8,939,399 B2 | 1/2015 | Kouros et al. | |
| 9,218,693 B2 | 12/2015 | Hale et al. | |
| 9,663,225 B1* | 5/2017 | Kooiman | B64F 5/40 |
| 9,821,908 B2 | 11/2017 | Schaeffer et al. | |
| 9,868,541 B2 | 1/2018 | Kooiman et al. | |
| 2011/0168835 A1 | 7/2011 | Oliver | |
| 2013/0099065 A1 | 4/2013 | Stuhlberger | |
| 2015/0217863 A1 | 8/2015 | Modrzejewski et al. | |

(Continued)

FOREIGN PATENT DOCUMENTS

| | | |
|---|---|---|
| EP | 3369655 A1 | 9/2018 |
| WO | WO-2010-123601 A1 | 10/2010 |

(Continued)

*Primary Examiner* — Jason H Duger
(74) *Attorney, Agent, or Firm* — Shackelford, Bowen, McKinley & Norton, LLP

(57) ABSTRACT

An exemplary tiltrotor aircraft with a hybrid drive system includes a first propulsion system having a first engine and a first supplemental driver operably coupled to a first proprotor that is operable between a helicopter mode and an airplane mode and a second propulsion system having a second engine and a second supplemental driver operably coupled to a second proprotor that is operable between a helicopter mode and an airplane mode.

20 Claims, 7 Drawing Sheets

(56) References Cited

U.S. PATENT DOCUMENTS

| | | |
|---|---|---|
| 2017/0297679 A1 | 10/2017 | Elliott et al. |
| 2017/0327219 A1 | 11/2017 | Alber |
| 2018/0057159 A1 | 3/2018 | Ivans et al. |
| 2018/0065739 A1 | 3/2018 | Vondrell et al. |
| 2019/0322379 A1 | 10/2019 | Mackin |

FOREIGN PATENT DOCUMENTS

| | | |
|---|---|---|
| WO | WO-2016-016889 A1 | 2/2016 |
| WO | WO-2016-085610 A1 | 6/2016 |

* cited by examiner

HYBRID TILTROTOR DRIVE SYSTEM

CROSS-REFERENCE TO RELATED APPLICATION

This application is a division of U.S. application Ser. No. 15/967,831, filed May 1, 2018, scheduled to issue as U.S. Pat. No. 10,906,656 on Feb. 2, 2021, the contents of which are incorporated by reference in their entirety herein for all purposes.

BACKGROUND

This section provides background information to facilitate a better understanding of the various aspects of the disclosure. It should be understood that the statements in this section of this document are to be read in this light, and not as admissions of prior art.

Tiltrotor aircraft, such as the Bell Boeing V-22 Osprey and Bell V-280 Valor, have proprotors on opposing sides of the aircraft that are selectively pivotable between a vertical orientation for rotor-borne flight (helicopter mode) and a horizontal orientation for wing-borne flight (airplane mode). Each proprotor is driven in rotation by an associated propulsion system comprising a turbine engine, a gearbox, and a transmission. The transmissions of the propulsion systems are connected with an interconnect driveshaft that maintains the left and the right proprotor at an equivalent rotational speed, revolutions per minute (RPM), and ensures that both proprotors are always connected with one of the engines. However, the interconnect driveshaft assembly adds undesirable weight to the wing and drive system.

SUMMARY

An exemplary hybrid tiltrotor drive system includes an engine coupled to a proprotor and a supplemental driver coupled to the proprotor.

An exemplary tiltrotor aircraft includes a first propulsion system having a first engine and a first supplemental driver operably coupled to a first proprotor that is operable between a helicopter mode and an airplane mode and a second propulsion system having a second engine and a second supplemental driver operably coupled to a second proprotor that is operable between a helicopter mode and an airplane mode.

An exemplary method of flying a tiltrotor aircraft having a first propulsion system comprising a first engine and a first supplemental driver coupled to a first proprotor that is operable between a helicopter mode and an airplane mode and a second propulsion system comprising a second engine and a second supplemental driver coupled to a second proprotor that is operable between a helicopter mode and an airplane mode, includes rotating the first proprotor at a first rotational speed in response to operation of the first engine, rotating the second proprotor at a second rotational speed in response to operation of the second engine; and actuating the first supplemental driver to apply energy to the first proprotor to maintain the first proprotor and the second proprotor at an equivalent rotational speed.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion. As will be understood by those skilled in the art with the benefit of this disclosure, elements, and arrangements of the various figures can be used together and in configurations not specifically illustrated without departing from the scope of this disclosure.

DETAILED DESCRIPTION

Figure 1:
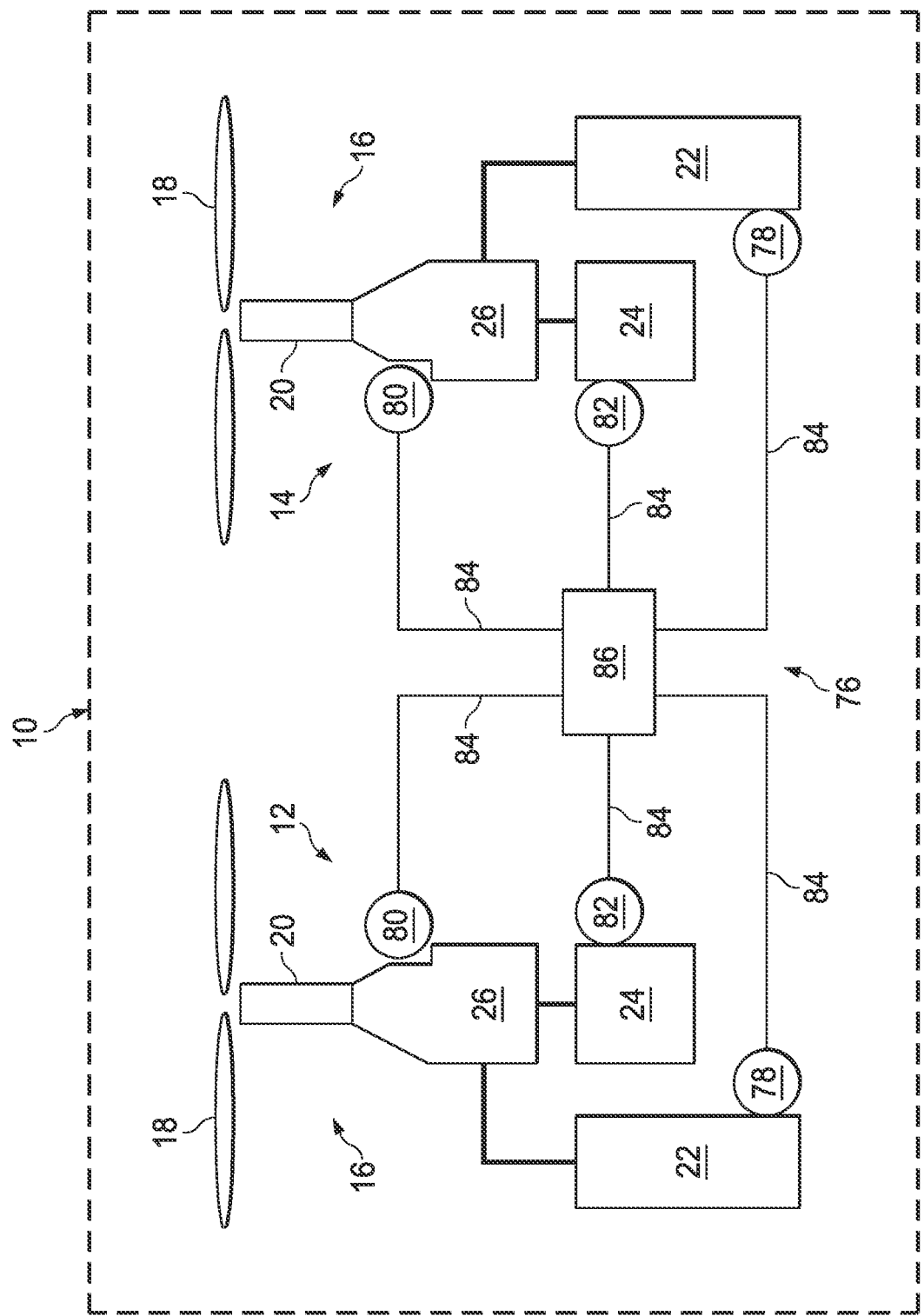
FIG. 1 is a schematic view of an illustrative hybrid tiltrotor drive system.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Illustrative embodiments of a hybrid tiltrotor drive system include a supplemental driver to supplement engine power, to account for engine lag, and to improve the responsiveness of the aircraft in particular in hover mode. The hybrid tiltrotor drive system achieves the unexpected result of maintaining the proprotors at an essentially equivalent rotational speed without using an interconnect drive shaft between the left and right proprotors (i.e., a cross-wing driveshaft).

FIG. 1 is a schematic illustration of an exemplary hybrid tiltrotor drive system generally denoted by the numeral 10. Hybrid tiltrotor drive system 10 includes two propulsion systems 12, 14. Each propulsion system 12, 14 includes a proprotor 16 that is responsive to torque and rotational energy provided by an associated drive system. The proprotor 16 includes proprotor blades 18 coupled to a mast 20. The drive system includes an engine 22, such as a combustion-driven turboshaft engine, and a supplemental driver 24, such as one or more of an electric motor, generator, and brake. The engine 22 and supplemental driver 24 are coupled to proprotor 16 through a gearbox 26 to transfer power and rotational speed to the proprotor 16. In a conventional tiltrotor aircraft, an interconnect driveshaft is used to connect the two propulsion systems 12, 14 so that transient power can be transferred from one propulsion system to the other to maintain an equivalent rotational speed of the proprotors 16. According to aspects of the hybrid tiltrotor drive system 10, supplemental driver 24 of the respective propulsion systems 12, 14 is operated to supplement the engine 22 power and to account for the engine 22 lag time to maintain an equivalent rotational speed of the proprotors 16. The supplemental driver 24 may be actuated to increase or decrease the speed of the associated proprotor 16.

The speed and actuation of the supplemental driver 24 can be controlled via an electronic control system 76, which may be a component of the flight-control system. Electronic control system 76 may operate supplemental driver 24 in response to measured or calculated rotational speeds. Rotational speed and torque can be detected by any suitable means, including for example engine sensors 78, proprotor sensors 80, and supplemental driver sensors 82. Data connection 84 provides for data transmission between the sensors and computer 86. All data connections according to this disclosure can be wired or wireless. Computer 86 may be a standalone device or may be an integral component of the flight control system. In this or other ways, rotational speeds of each of the relevant components can be sensed and compared. Electronic control systems are well known in the industry and can be easily adapted to suit desired applications in this disclosure.

Figure 2:
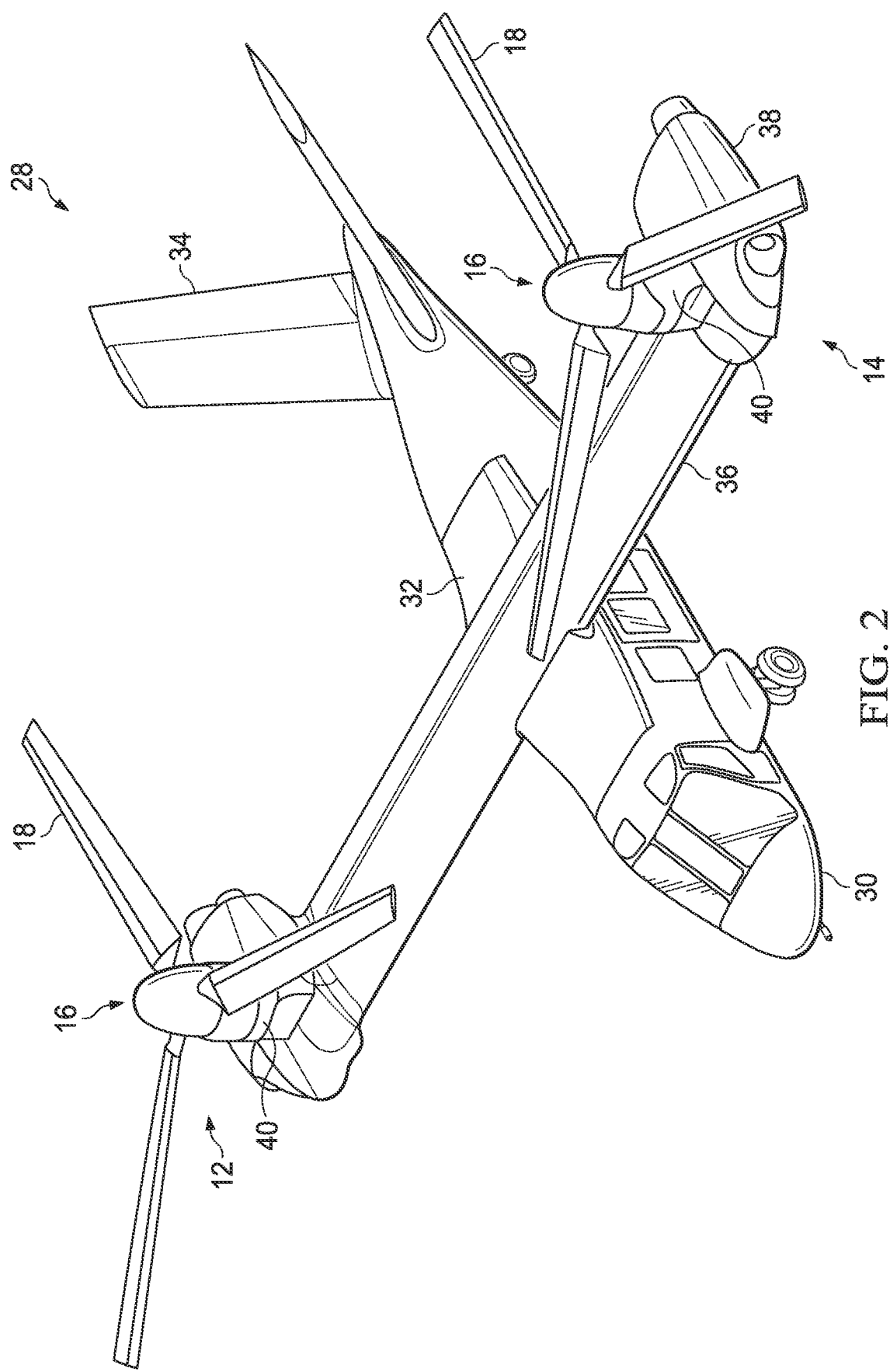
FIGS. 2 and 3 illustrate examples of tiltrotor aircraft that can implement hybrid tiltrotor drive systems according to aspects of the disclosure.
Figure 3:
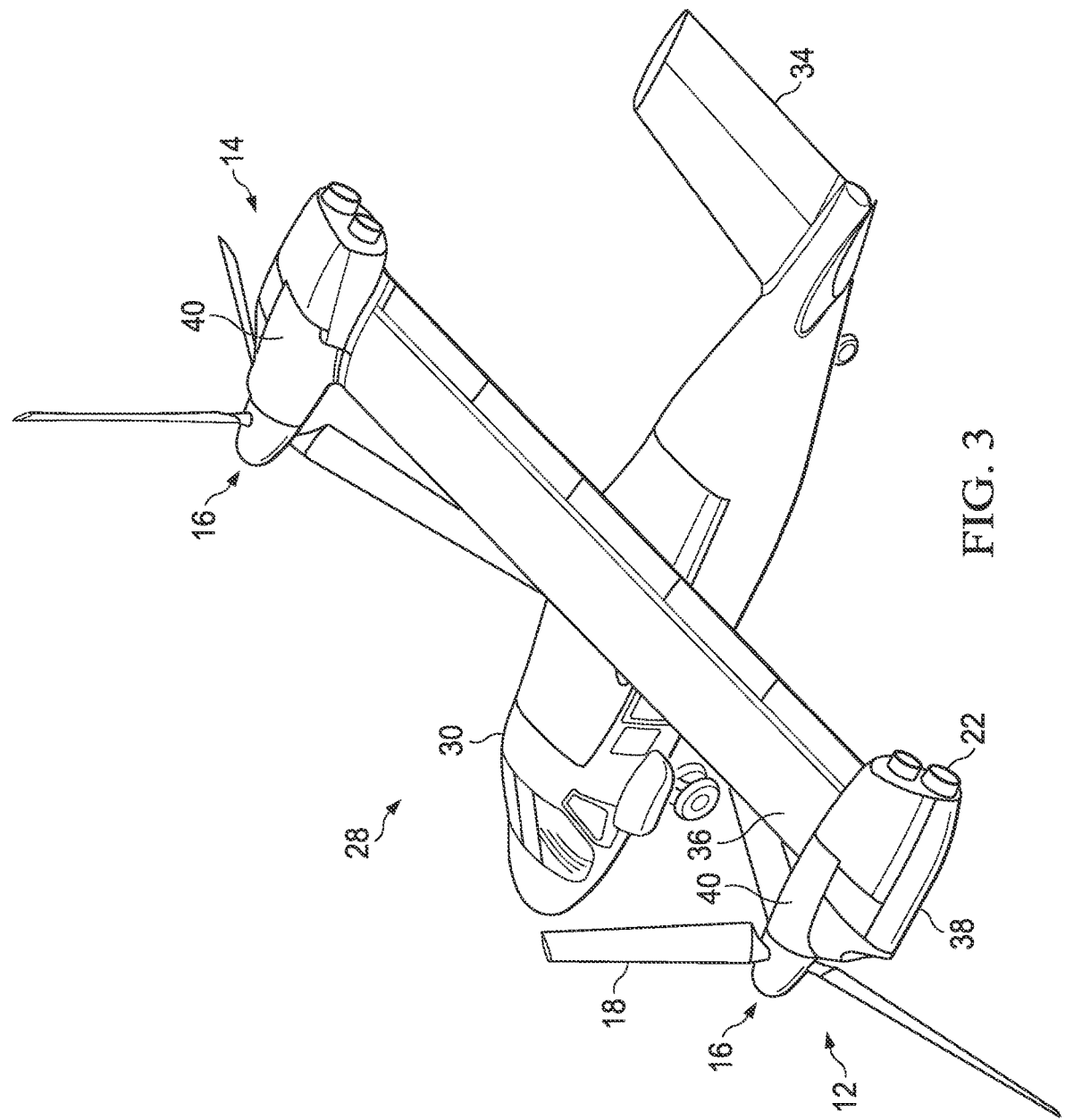

FIGS. 2 and 3 illustrate an exemplary tiltrotor aircraft 28 that can incorporate the hybrid tiltrotor drive system 10. Tiltrotor aircraft 28 includes a fuselage 30, a wing mount assembly 32 that is rotatable relative to fuselage 30 and a tail assembly 34 including rotatably mounted tail members having control surfaces operable for horizontal and/or vertical stabilization during forward flight. A wing 36 is supported by wing mount assembly 32 and may rotate with wing mount assembly 32 relative to fuselage 30 to enable tiltrotor aircraft 28 convert to a storage configuration. Together, fuselage 30, tail assembly 34 and wing 36 as well as their various frames, longerons, stringers, bulkheads, spars, ribs, skins and the like may be considered to be the airframe of tiltrotor aircraft 28.

Located proximate the outboard ends of wing 36 are propulsion systems 12, 14. The propulsion system 12 is substantially symmetric to propulsion system 14, therefore, for the sake of efficiency certain features will be disclosed only with regard to propulsion system 12. However, one of ordinary skill in the art would fully appreciate an understanding of propulsion system 14 based upon the disclosure herein of propulsion system 12.

In this illustrated embodiment, propulsion system 12 includes a fixed nacelle 38 that houses the engine 22 and a fixed portion of the drive system. Propulsion system 12 includes a pylon assembly 40 that is positioned inboard of fixed nacelle 38 and above wing 36. Pylon assembly 40 is rotatable relative to fixed nacelle 38 and wing 36 between a generally vertical orientation, as best seen in FIG. 2, and a generally horizontal orientation, as best seen in FIG. 3. Pylon assembly 40 includes a rotatable portion of the drive system and proprotor 16 that is rotatable responsive to torque and rotational energy provided via the engine and drive system. Supplemental driver 24 may be located in the fixed or the rotatable portion of the drive system as will be understood by one of ordinary skill in the art with reference to the is disclosure.

FIG. 2 illustrates aircraft 28 in helicopter or VTOL flight mode, in which proprotors 16 are rotating in a substantially horizontal plane to provide a lifting thrust, such that aircraft 28 flies much like a conventional helicopter. FIG. 3 illustrates aircraft 28 in an airplane or forward flight mode, in which proprotors 16 are rotating in a vertical plane to provide a forward thrust enabling wing 36 to provide a lifting force responsive to forward airspeed, such that aircraft 28 flies much like a conventional propeller driven aircraft. It should be appreciated that aircraft 28 can be operated such that proprotors 16 are selectively positioned between airplane mode and helicopter mode, which can be referred to as a conversion flight mode.

During all flight modes, proprotors 16 rotate in opposite directions to provide torque balancing to aircraft 28. In the illustrated embodiment, proprotors 16 each include three twisted proprotor blades 18 that are equally spaced apart circumferentially at approximately 120-degree intervals. It should be understood by those having ordinary skill in the art, however, that the proprotors could have proprotor blades with other designs and other configurations including proprotors having four, five or more proprotor blades. Further, it should be understood by those having ordinary skill in the art that even though propulsion systems 12, 14 are illustrated in the context of tiltrotor aircraft 28, the propulsion systems of the present disclosure can be implemented on other types of tiltrotor aircraft including, for example, quad tiltrotor aircraft and unmanned tiltrotor aircraft, to name a few.

During flight, transient torque may be experienced from one proprotor 16 to the other proprotor 16 due to certain maneuvers, such as, for example, turns. These maneuvers can cause forces on proprotors 16 that cause one proprotor 16 to rotate faster than the other proprotor 16. Supplemental driver 24 of one or both of the propulsion systems 12, 13 is actuated to supplement the engine 22 power to maintain the proprotors 16 of the propulsion systems 12, 14 at an equivalent rotational speed.

Figure 4:
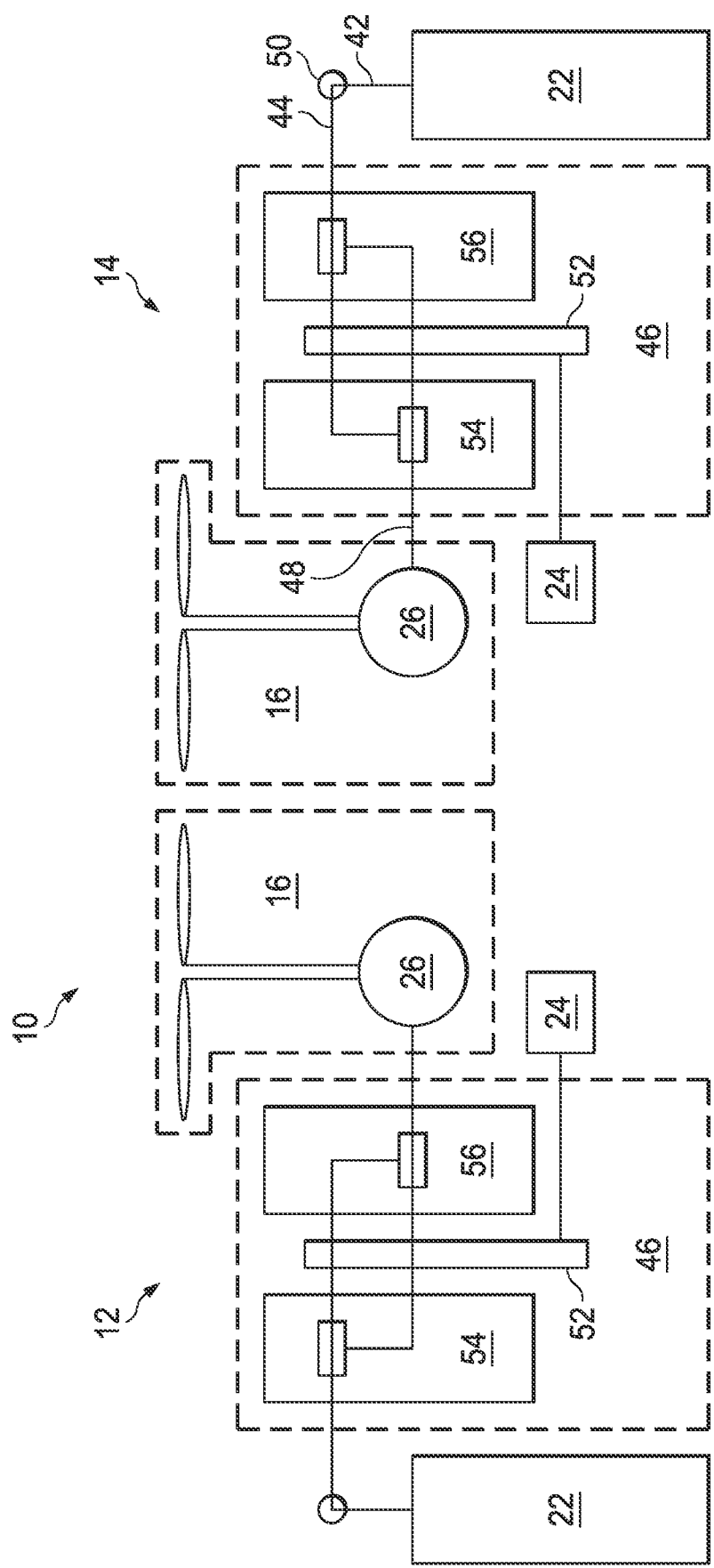
FIG. 4 is a schematic view of an illustrative hybrid tiltrotor drive system according to one or more aspects of the disclosure.
Figure 5:
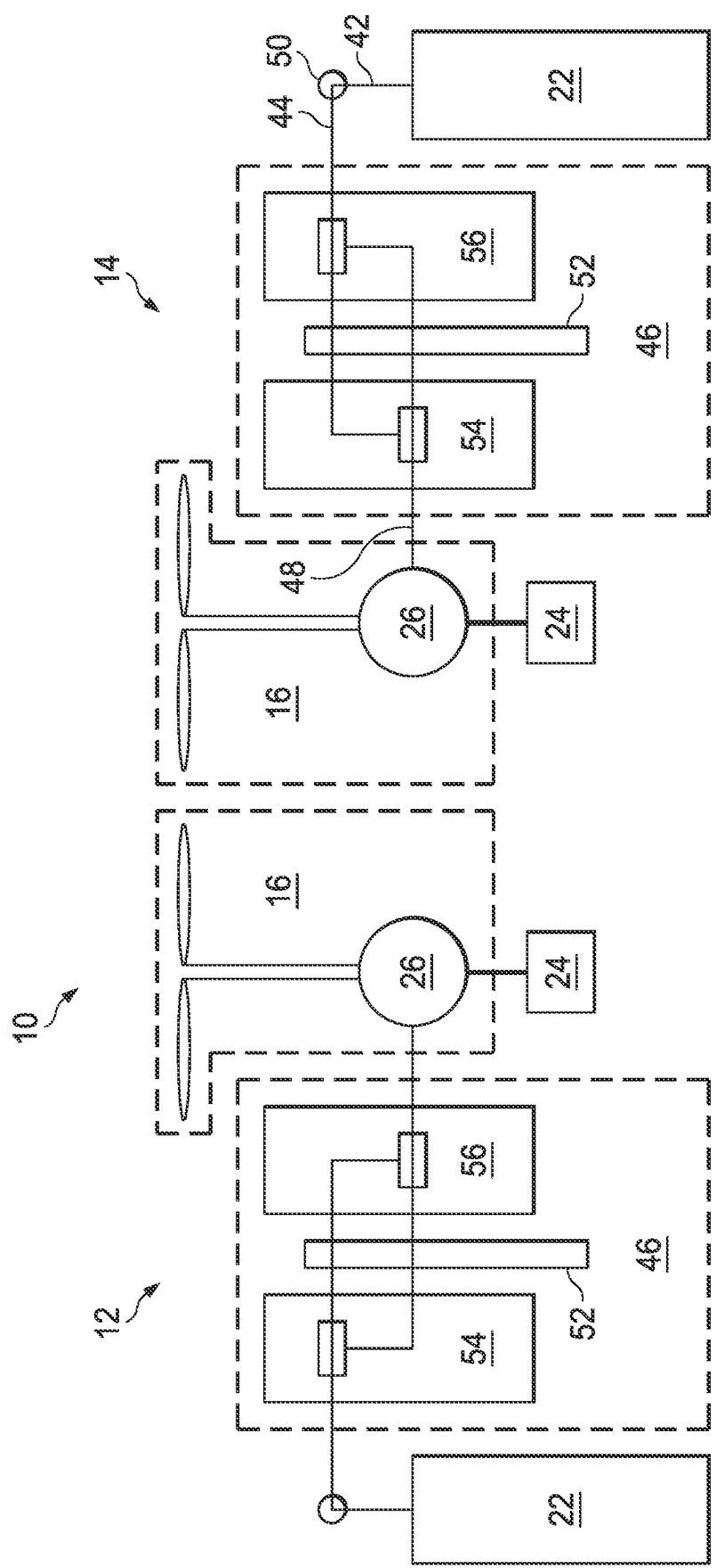
FIG. 5 is a schematic view of an illustrative hybrid tiltrotor drive system according to one or more aspects of the disclosure.

FIGS. 4 and 5 are schematic illustrations of exemplary embodiments of the hybrid tiltrotor drive system 10. It should be understood by those having ordinary skill in the art that even though hybrid tiltrotor drive system 10 is illustrated in the context of fixed-engine tiltrotor aircraft, however, the hybrid tiltrotor drive system can be implemented on other types of tiltrotor aircraft.

Engine 22 has an engine output shaft 42 that is coupled to an input shaft 44 of a fixed gearbox 46. An output shaft 48 of the fixed gearbox 46 is coupled to the proprotor 16. The engine output shaft 42 can be coupled to the input shaft 44 of the fixed gearbox 46 through a spiral bevel gearbox 50 that includes spiral bevel gears to change torque direction by 90 degrees. The fixed gearbox 46 includes a plurality of gears, such as helical gears 52, coupled to the output shaft 48. One or more auxiliary devices, such as one or more pumps (e.g., a hydraulic pump, a coolant pump, etc.), blowers, electrical generators and the like, may be coupled to the gears 52. In FIGS. 4 and 5, the fixed gearbox 46 is a variable speed gearbox having a high-speed gear train 54 and a low-speed gear train 56. The fixed engine gearbox may be a fixed-ratio gearbox in some embodiments. Torque is transferred from the output shaft 48 to an input of a proprotor gearbox 26 of the proprotor 16.

In FIG. 4, supplemental driver 24 is connected directly to the fixed-gearbox 46. In FIGS. 1 and 5, supplemental driver 24 is connected directly to proprotor gearbox 26. An exemplary embodiment of a proprotor gearbox is described below with reference to FIG. 7.

Upon a commanded power change, turboshaft engines 22 have a lag time or delay, for example, approximately one-half second, before the shaft and proprotor speed are changed. Supplemental driver 24 can be actuated to increase or decrease the speed of the associated proprotor 16 to maintain the proprotors 16 of the propulsion systems 12, 14 at an equivalent rotational speed. In accordance with one or more embodiments, supplemental driver 24 is an electrically controlled device such a motor, generator or brake. It is contemplated that supplemental driver 24 can be controlled within fractions of a millisecond, for example in the range of 0.0001 to 0.1 seconds, from a signal to change speed.

Figure 6:
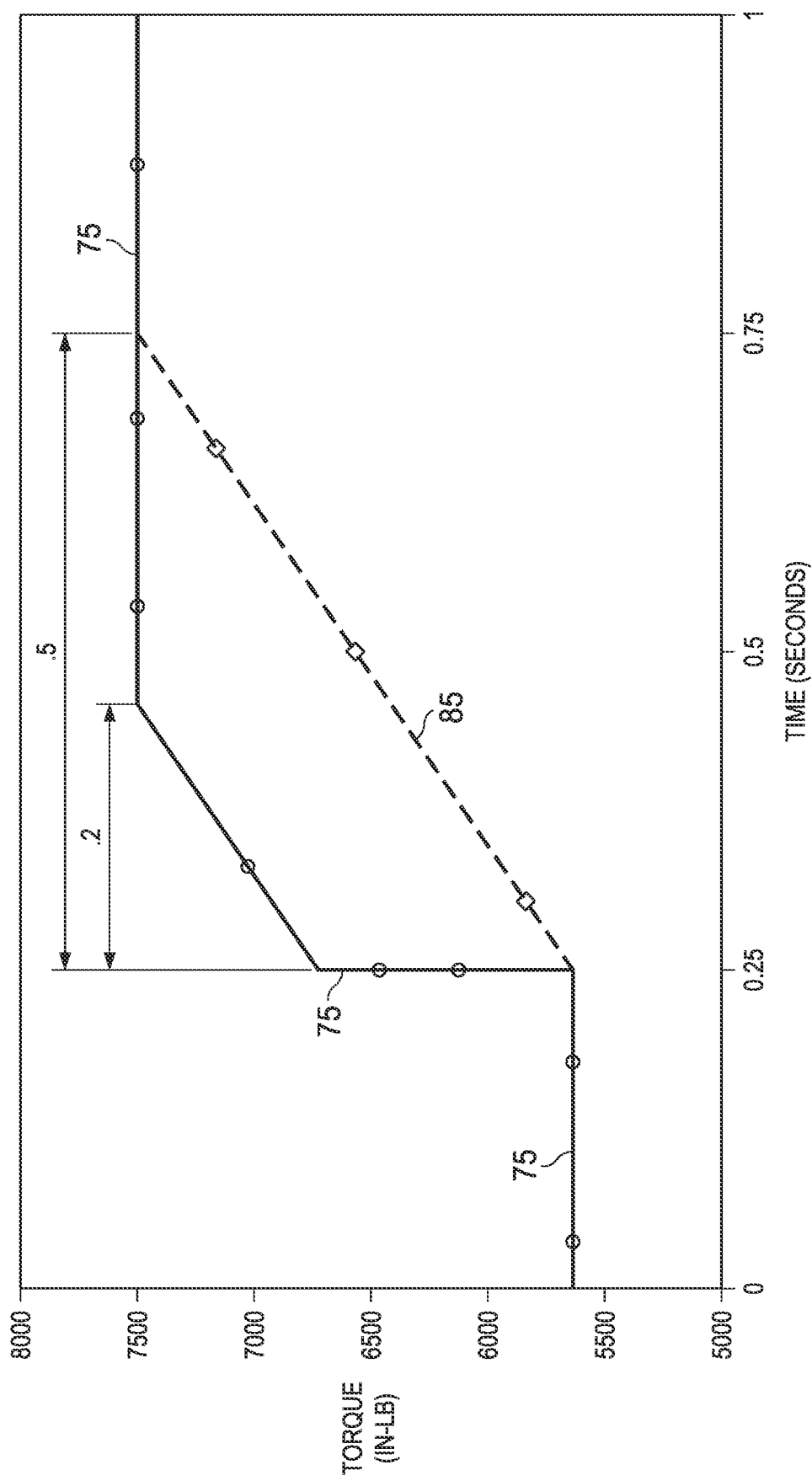
FIG. 6 is a graphical illustration of torque time response of a conventional turboshaft only drive system and a hybrid tiltrotor drive system according to one or more aspects of the disclosure.

FIG. 6 graphically illustrates torque time response of a conventional turboshaft only drive system and a hybrid tiltrotor drive system. In this example, the supplemental driver is a 300-horsepower electric motor. The line 75 shows the torque versus time response of a conventional turboshaft engine only drive system and a line 85 shows the torque versus time response of a hybrid tiltrotor drive system utilizing a turboshaft engine 22 and a supplemental driver 24.

Figure 7:
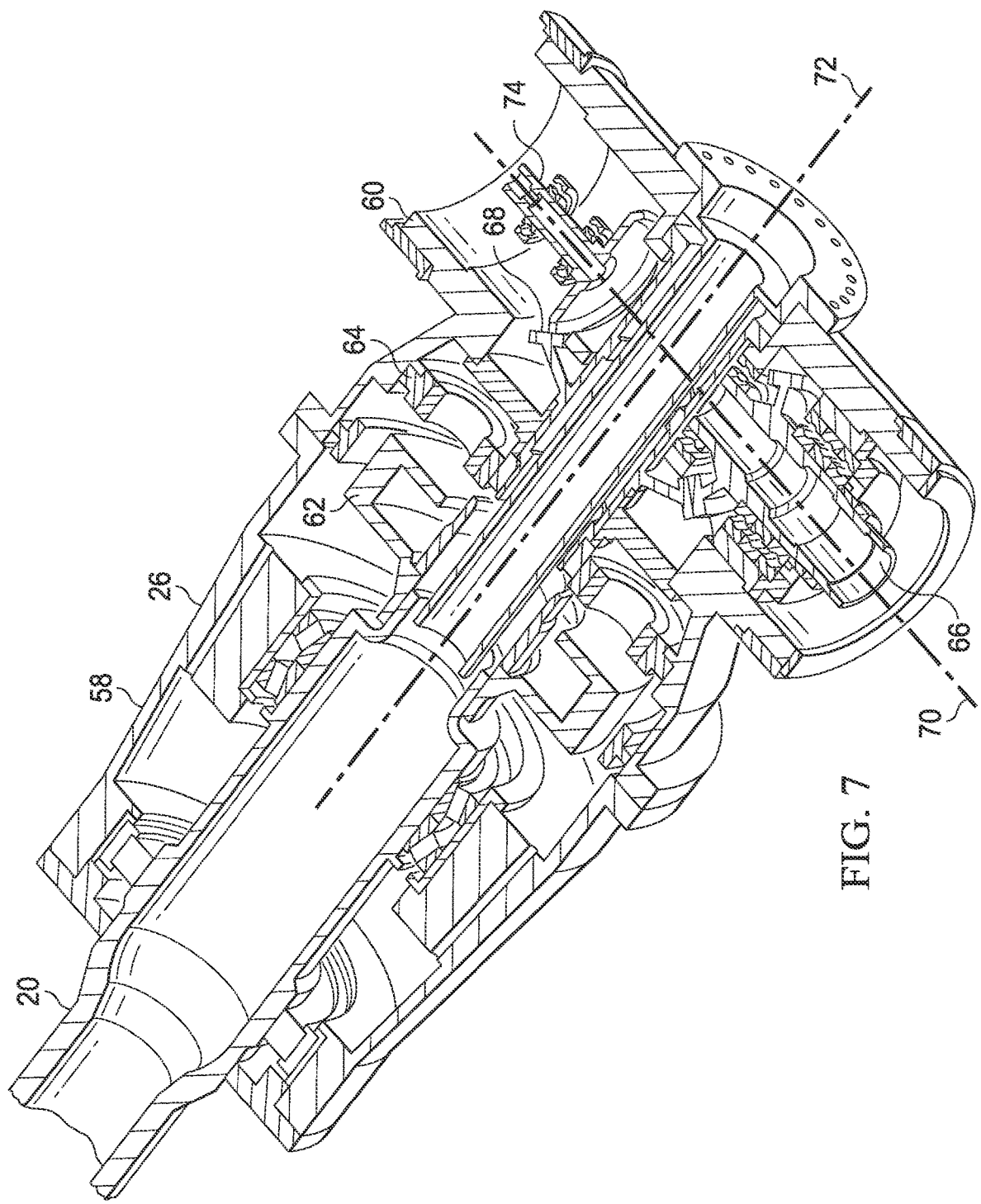
FIG. 7 illustrates an exemplary embodiment of a proprotor gearbox according to one or more aspects of the disclosure.

FIG. 7 illustrates an exemplary embodiment of a proprotor gearbox 26. Proprotor gearbox 26 is configured to transfer power and rotation to mast 20. Proprotor gearbox 26 includes a top case portion 58 and spindle gearbox 60. Speed reduction is accomplished by a low-speed planetary gear assembly 62 and a high-speed planetary gear assembly 64. A spiral bevel gear assembly includes spiral bevel input gear 66 and a spiral bevel output gear 68. The spiral bevel gear assembly changes power direction from along longitudinal axis 70 of spiral bevel input gear 66 to a centerline axis 72 of spiral bevel output gear 68. An accessory drive 74 can be coupled to spiral bevel output gear 68. With reference, in particular to FIGS. 1 and 5, the supplemental driver 24 can be coupled to the accessory drive 74 to be actuated to increase the speed of rotation of mast 20 through the spiral bevel output gear 68 or actuated to apply a load to decrease the speed of rotation of the mast.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, as recognized by a person of ordinary skill in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A hybrid tiltrotor drive system, comprising:
   a first propulsion system comprising a first engine fixed relative to a wing and a first pylon rotatable relative to the wing and the first engine, the first pylon comprising a first proprotor and a first proprotor gearbox, wherein the first engine comprises a first engine output shaft coupled to a first fixed gearbox and the first fixed gearbox is coupled by a first fixed gearbox output shaft to the first proprotor gearbox to apply a first torque from the first engine to the first proprotor;
   a second propulsion system comprising a second engine fixed relative to the wing and a second pylon rotatable relative to the wing and the second engine, the second pylon comprising a second proprotor and a second proprotor gearbox, wherein the second engine comprises a second engine output shaft coupled to a second fixed gearbox and the second fixed gearbox is coupled by a second fixed gearbox output shaft to the second proprotor gearbox to apply a second torque from the second engine to the second proprotor; and
   a first supplemental driver coupled directly to the first fixed gearbox to apply a first transient energy to the first proprotor simultaneous with the first torque to maintain the first proprotor and the second proprotor at an equivalent rotational speed.

2. The hybrid tiltrotor drive system of claim 1, wherein the first engine is a combustion-driven turboshaft engine and the first supplemental driver is an electric motor or a brake.

3. The hybrid tiltrotor drive system of claim 1, wherein the first engine is a combustion-driven turboshaft engine; and
   the first supplemental driver is an electric motor.

4. The hybrid tiltrotor drive system of claim 1, wherein the first supplemental driver is an electric motor.

5. The hybrid tiltrotor drive system of claim 1, wherein the first proprotor and the second proprotor are not interconnected by a drive shaft.

6. The hybrid tiltrotor drive system of claim 1, wherein the first supplemental driver is an electric motor; and
   the first proprotor and the second proprotor are not interconnected by a drive shaft.

7. The hybrid tiltrotor drive system of claim 1, wherein the first engine is a combustion-driven turbo shaft engine;

the first supplemental driver is an electric motor or a brake; and
the first proprotor and the second proprotor are not interconnected by a drive shaft.

8. The hybrid tiltrotor drive system of claim 1, further comprising:
sensors coupled with the first and the second proprotors to determine rotational speed; and
an electronic control system operationally coupled to the first supplemental driver and the sensors, the electronic control system configured to selectively operate the first supplemental driver to maintain the equivalent rotational speed of the first and second proprotors.

9. The hybrid tiltrotor drive system of claim 8, wherein the first supplemental driver is an electric motor.

10. The hybrid tiltrotor drive system of claim 8, wherein the first proprotor and the second proprotor are not interconnected by a drive shaft.

11. The hybrid tiltrotor drive system of claim 8, wherein the first supplemental driver is an electric motor; and
the first proprotor and the second proprotor are not interconnected by a drive shaft.

12. The hybrid tiltrotor drive system of claim 8, wherein the first engine is a combustion-driven turbo shaft engine;
the first supplemental driver is an electric motor or a brake; and
the first proprotor and the second proprotor are not interconnected by a drive shaft.

13. The hybrid tiltrotor drive system of claim 1, further comprising a second supplemental driver coupled directly to the second fixed gearbox to apply a second transient energy to the second proprotor simultaneous with the second torque to maintain the first proprotor and the second proprotor at the equivalent rotational speed.

14. The hybrid tiltrotor drive system of claim 13, wherein the first proprotor and the second proprotor are not interconnected by a driveshaft.

15. The hybrid tiltrotor drive system of claim 13, wherein the first and second supplemental drivers are electric motors.

16. The hybrid tiltrotor drive system of claim 15, wherein the first proprotor and the second proprotor are not interconnected by a drive shaft.

17. The hybrid tiltrotor drive system of claim 13, further comprising:
sensors coupled with the first and the second proprotors to determine rotational speed; and
an electronic control system operationally coupled to the first supplemental driver, the second supplemental driver, and the sensors, the electronic control system configured to selectively operate the first supplemental driver and the second supplemental driver to maintain the equivalent rotational speed of the first and second proprotors.

18. A method, comprising:
flying a tiltrotor aircraft, wherein the tiltrotor aircraft comprises:
a first propulsion system comprising a first engine fixed relative to a wing and a first pylon rotatable relative to the wing and the first engine, the first pylon comprising a first proprotor and a first proprotor gearbox, wherein the first engine comprises a first engine output shaft coupled to a first fixed gearbox and the first fixed gearbox is coupled by a first fixed gearbox output shaft to the first proprotor gearbox to apply a first torque from the first engine to the first proprotor;
a second propulsion system comprising a second engine fixed relative to the wing and a second pylon rotatable relative to the wing and the second engine, the second pylon comprising a second proprotor and a second proprotor gearbox, wherein the second engine comprises a second engine output shaft coupled to a second fixed gearbox and the second fixed gearbox is coupled by a second fixed gearbox output shaft to the second proprotor gearbox to apply a second torque from the second engine to the second proprotor;
a first supplemental driver coupled directly to the first fixed gearbox to apply a first transient energy to the first proprotor simultaneous with the first torque to maintain the first proprotor and the second proprotor at an equivalent rotational speed; and
a second supplemental driver coupled directly to the second fixed gearbox to apply a second transient energy to the second proprotor simultaneous with the second torque to maintain the first proprotor and the second proprotor at the equivalent rotational speed, wherein the flying comprises:
rotating the first proprotor at a first rotational speed;
rotating the second proprotor at a second rotational speed; and
actuating the first supplemental driver to apply energy to the first proprotor to maintain the first proprotor and the second proprotor at the equivalent rotational speed.

19. The method of claim 18, wherein the first propulsion system and the second propulsion system are not interconnected by a driveshaft.

20. The method of claim 18, wherein the first and second engines are combustion-driven turboshaft engines; and
the first and second supplemental drivers comprise an electric motor.

* * * * *